(12) United States Patent
Kalinowski

(10) Patent No.: US 12,096,746 B2
(45) Date of Patent: Sep. 24, 2024

(54) DOG BED WITH MATTRESS CONSTRUCTED OF 3-D SPACER MESH FABRIC

(71) Applicant: Andrew Kalinowski, Murrumbeena (AU)

(72) Inventor: Andrew Kalinowski, Murrumbeena (AU)

(*) Notice: Subject to any disclaimer, the term of this patent is extended or adjusted under 35 U.S.C. 154(b) by 91 days.

(21) Appl. No.: 17/961,065

(22) Filed: Oct. 6, 2022

(65) Prior Publication Data

US 2024/0114879 A1 Apr. 11, 2024

(51) Int. Cl.
*A01K 1/035* (2006.01)
(52) U.S. Cl.
CPC .................................. *A01K 1/0353* (2013.01)
(58) Field of Classification Search
CPC .................................................... A01K 1/0353
See application file for complete search history.

(56) References Cited

U.S. PATENT DOCUMENTS

| | | | | |
|---|---|---|---|---|
| 4,860,689 A | * | 8/1989 | Stewart | A01K 1/0353 119/28.5 |
| 7,614,098 B1 | * | 11/2009 | Quarry | A47D 15/008 24/711.1 |
| 9,648,846 B2 | * | 5/2017 | Landers | B29C 63/0026 |
| 10,881,217 B2 | * | 1/2021 | Moon | A47C 27/053 |
| 11,445,697 B2 | * | 9/2022 | Taylor | A01K 1/0353 |
| 2002/0108578 A1 | * | 8/2002 | Kostial | A01K 1/0353 119/28.5 |
| 2005/0087142 A1 | * | 4/2005 | Dalal | A01K 1/0353 119/28.5 |
| 2016/0106061 A1 | * | 4/2016 | Nelson | A01K 1/0353 119/28.5 |
| 2019/0183090 A1 | * | 6/2019 | Komatsubara | A01K 1/0353 |
| 2019/0208742 A1 | * | 7/2019 | Goodwin | A01K 1/0353 |
| 2023/0115100 A1 | * | 4/2023 | Lim | A47C 27/15 5/636 |

FOREIGN PATENT DOCUMENTS

DE 102017007561 A1 * 2/2019

* cited by examiner

*Primary Examiner* — Brady W Frazier
*Assistant Examiner* — Katherine Anne Kloecker
(74) *Attorney, Agent, or Firm* — Eric Karich; Karich & Associates

(57) ABSTRACT

A dog bed has a mattress having a top surface and a bottom surface that each extends outwardly to an outer perimeter, the mattress having a length, a width, and a height that are suitable for a dog to sleep upon. The mattress has at least one layer of 3D spacer mesh fabric.

2 Claims, 1 Drawing Sheet

DOG BED WITH MATTRESS CONSTRUCTED OF 3-D SPACER MESH FABRIC

BACKGROUND OF THE INVENTION

Field of the Invention

This invention relates generally to dog beds, and more particularly to a dog bed that includes a mattress constructed of at least one layer of 3D spacer mesh fabric.

Description of Related Art

Many modern dog beds are constructed with layers of memory foam, which provide good support, especially for dogs suffering from hip dysplasia, arthritis, and other painful body conditions. However, high quality memory foam beds are expensive, and the cheap alternatives tend to release harmful chemicals and lose their body-supportive qualities over time. Additionally, memory foam tends to trap the animal's body heat, which may present a welfare concern for recumbent animals who have difficulty in turning over.

The prior art teaches dog beds constructed of memory foam. However, the prior art does not teach the use of 3D spacer mesh fabrics in a dog bed, which the inventor has found can provide superior qualities at a lower price. The present invention fulfills these needs and provides further advantages as described in the following summary.

SUMMARY OF THE INVENTION

The present invention teaches certain benefits in construction and use which give rise to the objectives described below.

The present invention provides a dog bed comprising a mattress having a top surface and a bottom surface that each extends outwardly to an outer perimeter, the mattress having a length, a width, and a height that are suitable for a dog to sleep upon. The mattress has at least one layer of 3D spacer mesh fabric.

A primary objective of the present invention is to provide a dog bed having advantages not taught by the prior art.

Another objective is to provide a dog bed that includes at least one layer of 3D spacer mesh fabric.

A further objective is to provide a dog bed that provides superior and long-lasting support while being lightweight, providing good airflow and ventilation inside the mattress, easily cleaned or washed and effectively sanitized for superior hygiene, quick to dry, durable, and chew-resistant.

A further objective is to provide a dog bed that is durable and retains its supportive qualities for long periods of time.

A further objective is to provide a dog bed that does not break down and release toxic chemicals (OEKO-TEX Standard 100 certified).

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a dog bed constructed of a 3D spacer mesh fabric.

The term "three-dimensional ("3D") spacer mesh fabric" is defined to mean a fabric which includes a sandwich structure comprising two separate outer layers linked together with a layer of spacer monofilaments or pile threads or other forms of fibers. For purposes of this application, the term "fabric" is defined to include various fiber-based materials, including fibers, yarns, filaments, threads, and different fabric types known in the art, which may be knitted, woven, non-woven, or formed using any other method known in the art.

Figure 1:
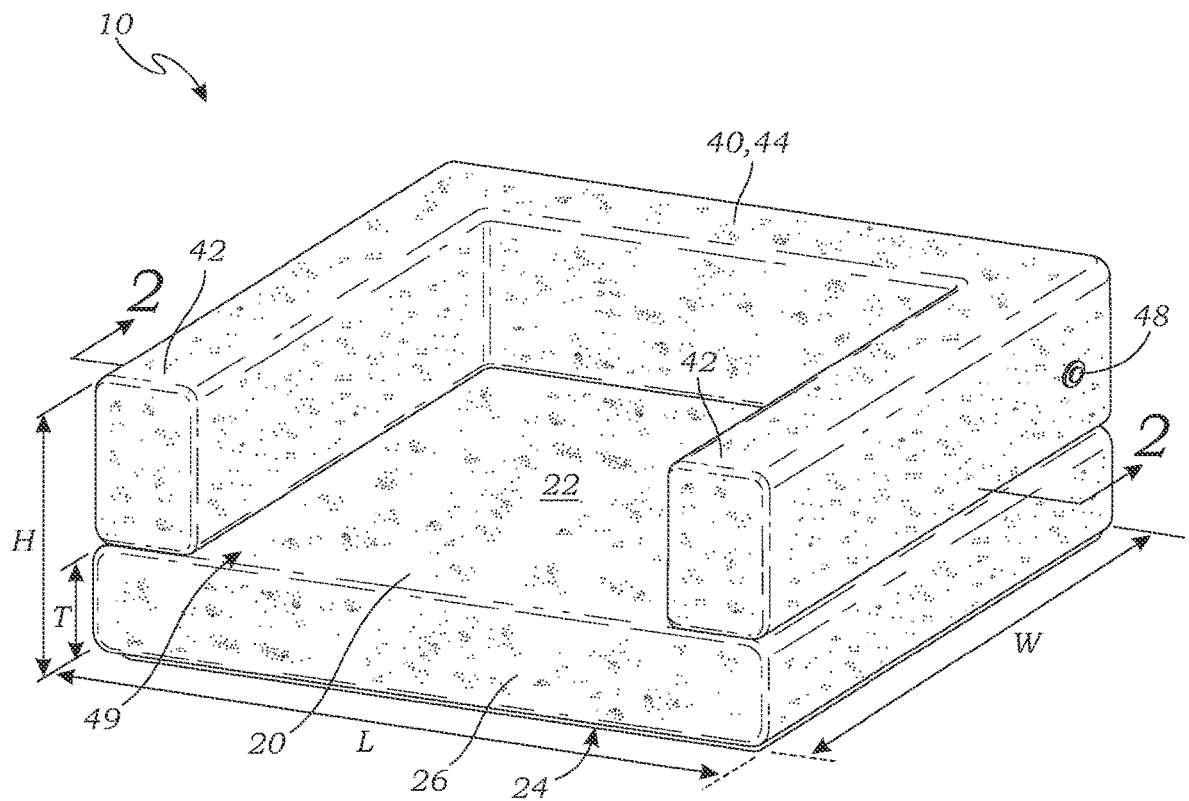
FIG. 1 is a perspective view of a dog bed according to one embodiment of the present invention.

FIG. 1 is a perspective view of a dog bed 10 according to one embodiment of the present invention. As shown in FIG. 1, the dog bed 10 comprises a mattress 20 having a top surface 22 and a bottom surface 24 that each extends outwardly to an outer perimeter 26. The mattress 20 has a length L, a width W, and a thickness T that are suitable for a dog to sleep upon. In the current embodiment, the length is 20-50 inches, the width is 15-30 inches, and the thickness is 10-100 mm, although these dimensions may vary according to the design selection of the manufacturer, and any suitable dimensions for accommodating a sleeping dog should be considered within the scope of the present invention. The mattress 20 may also include a bolster 40, which is discussed in greater detail below.

Figure 2:
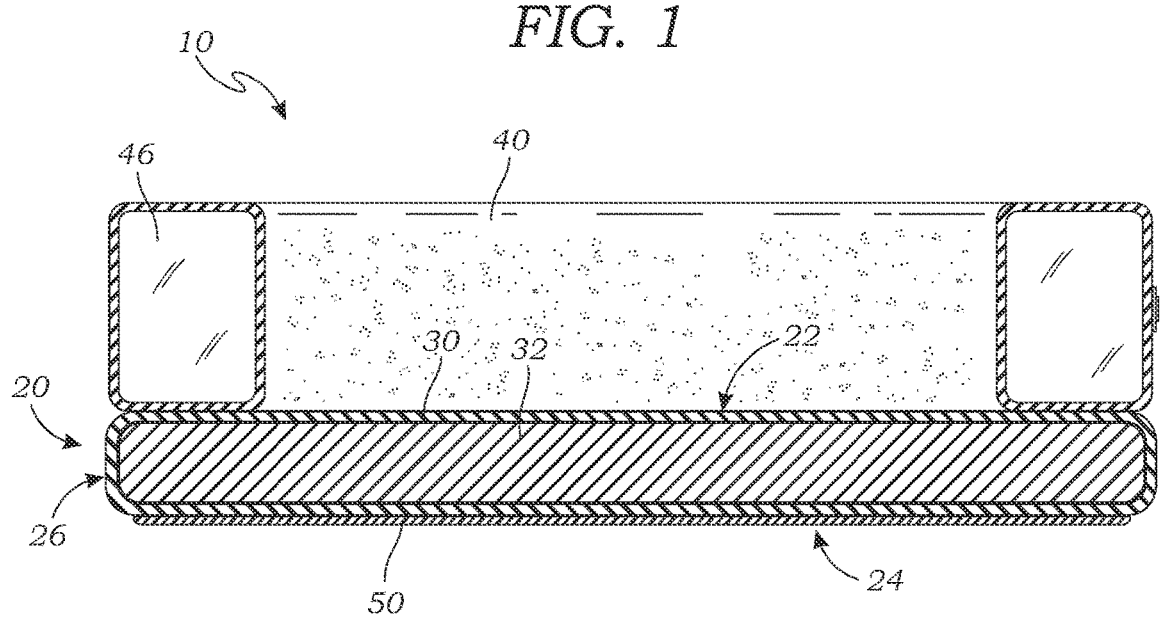
FIG. 2 is a sectional view thereof taken along line 2-2 in FIG. 1.

FIG. 2 is a sectional view of the dog bed 10 taken along line 2-2 in FIG. 1. As shown in FIG. 2, the mattress has at least one layer of the 3D spacer mesh fabric, and each of the at least one layers of the 3D spacer mesh fabric has a thickness of 3-20 mm, and a density of between 200-1500 g/m2. In some embodiments, multiple layers of the 3D spacer mesh fabric are included, providing a total thickness that may vary, typically forming a structure that is between 5-50 mm.

In this embodiment, there are three layers, an outer envelope 30 (which forms two layers) and an inner layer 32 disposed inside the envelope 30, all formed of the 3D spacer mesh fabric. In this embodiment, the outer envelope 30 is constructed of a 3D spacer mesh fabric having a thickness of 3-10 mm, in this case about 7 mm, and a density of about 340 g/m2.

The inner layer 32 is positioned entirely within the outer envelope 30, the inner layer 32 also being constructed of a 3D spacer mesh fabric having a thickness of 7-20 mm. In one embodiment, the inner layer has a thickness of about 20 mm and a density of about 1230 g/m2. In another embodiment, the inner layer has a thickness of 100 mm and a density of about 820 g/m2. In another embodiment, the inner layer 32 may include multiple layers of varying thicknesses and densities, so long as the cushioning is suitable for supporting a dog. The total thickness is preferably between 10-100 mm, so that suitable cushioning may be provided, but not making the mattress 20 so thick that it is difficult for the dog to enter the bed 10.

The dog bed 10 of this construction provides superior and long-lasting support while being lightweight, and providing good airflow and ventilation inside the mattress. The mattress 20 is easily cleaned, quick to dry, durable, and chew-resistant. The dog bed 10 is also durable and retains its supportive qualities for long periods of time. Finally, the dog bed 10 does not break down and release toxic chemical fumes (OEKO-TEX Standard 100 certified).

The dog bed 10 may further comprise a bolster 40 that extends around a part of the perimeter 26 of the mattress 20. In this case, the bolster 40 extends upwardly from the top surface 22 of the mattress 20, giving the mattress 20 plus bolster 40 a total height H; however, the bolster 30 could alternatively be positioned adjacent the perimeter 26, or in another disposition that may be selected by one skilled in the art.

In one embodiment, as shown in FIG. 1, the bolster 40 may be in the form of an inflatable tube that has a curved body 44 that extends in a generally C-shape, or U-shape, to ends 42. In another embodiment the bolster 40 may be straight, and just cover a back edge of the mattress 20. A space 49 (shown in FIG. 1) formed between the ends 42 is provided so that a dog may readily enter and exit the bed 10. In one embodiment, the inflatable tube 40 is constructed of PVC or other suitable material, and surrounds an open chamber 46 (shown in FIG. 2), which may be inflated via inflation port 48 shown in FIG. 1. In another embodiment, the bolster is constructed of 3D spacer mesh fabric, or other suitable material. In alternative embodiments, the bolster 40 may be omitted.

The dog bed's mattress 20 may be covered with a suitable waterproof fabric (not shown) which may be coated on one side with thermoplastic polyurethane or any suitable waterproofing film (not shown). Many such coverings are known in the art, e.g., Sherpa, plush, microsuede, etc. The dog bed 10 may further includes a skid resistant coating 50 on the bottom surface 24, to prevent the pet bed 10 from easily sliding around during use.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A dog bed comprising:
a mattress having a top surface and a bottom surface that each extends outwardly to an outer perimeter, the mattress having a length, a width, and a thickness, wherein the length is 20-50 inches, the width is 15-30 inches, and the thickness is 10-100 mm;
wherein the mattress includes an outer envelope constructed of a 3D spacer mesh fabric, and further includes an inner layer that is positioned within the outer envelope, the inner layer also being constructed of a 3D spacer mesh fabric;
wherein the outer envelope has a thickness of about 7 mm and a density of about 340 g/m2; and
wherein the inner layer has a thickness of about 20 mm and a density of about 1230 g/m2.

2. A dog bed comprising:
a mattress having a top surface and a bottom surface that each extends outwardly to an outer perimeter, the mattress having a length, a width, and a thickness, wherein the length is 20-50 inches, the width is 15-30 inches, and the thickness is 10-100 mm;
wherein the mattress consists of:
an outer envelope constructed of a 3D spacer mesh fabric;
an inner layer that is positioned within the outer envelope, the inner layer also being constructed of a 3D spacer mesh fabric;
wherein the outer envelope has a thickness of about 7 mm;
wherein the inner layer has a thickness of about 7-20 mm; and
wherein the outer envelope has a density that is less than half of the density of the inner layer.

* * * * *